June 23, 1970     R. A. CLAPP     3,516,740
ILLUMINATION CONTROL DURING COLOR PRINTING
Filed Feb. 20, 1968     2 Sheets-Sheet 1
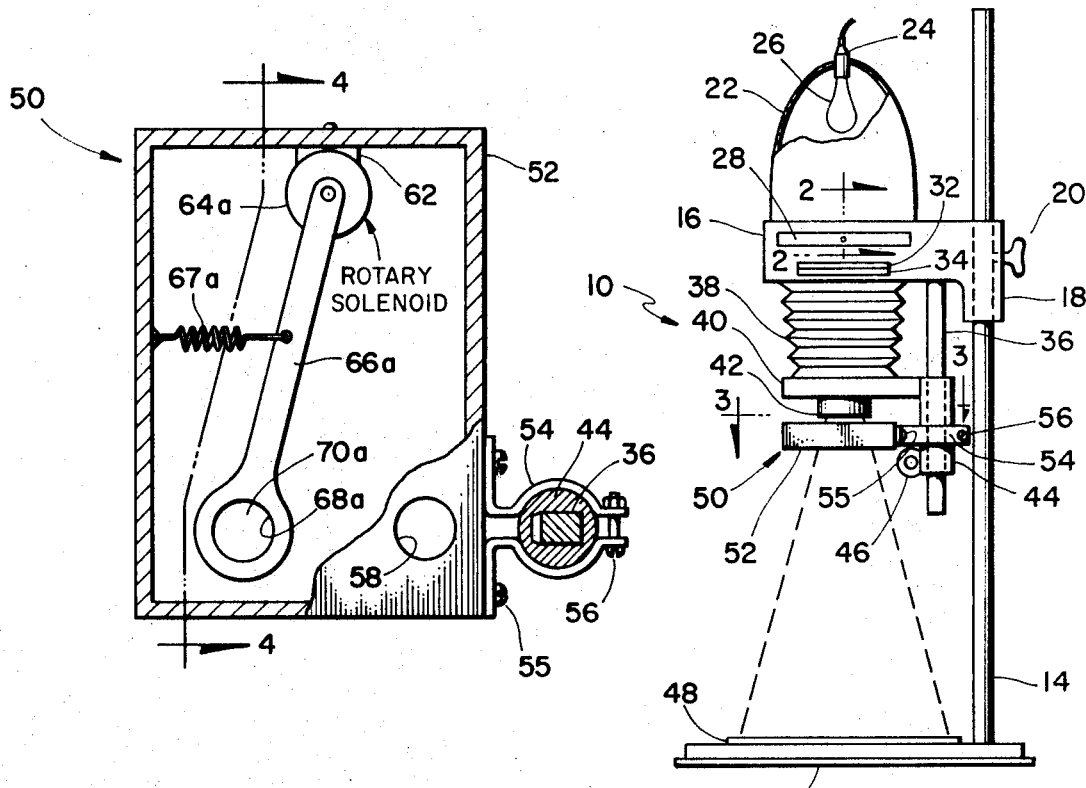
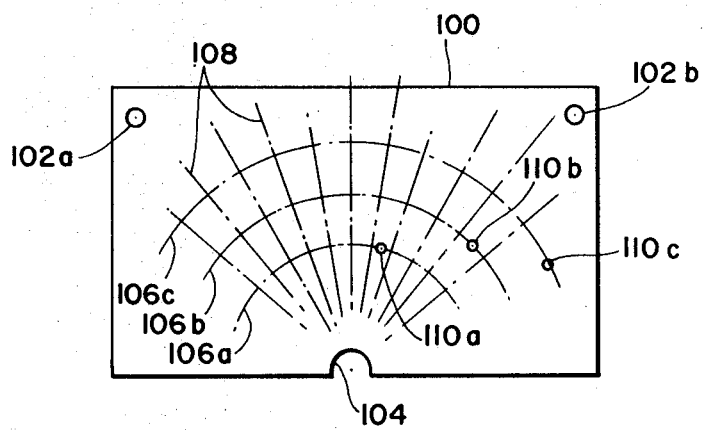
INVENTOR.
ROY A. CLAPP
BY
Dugger, Peterson, Johnson & Westman
Attorneys June 23, 1970   R. A. CLAPP   3,516,740
ILLUMINATION CONTROL DURING COLOR PRINTING
Filed Feb. 20, 1968   2 Sheets-Sheet 2
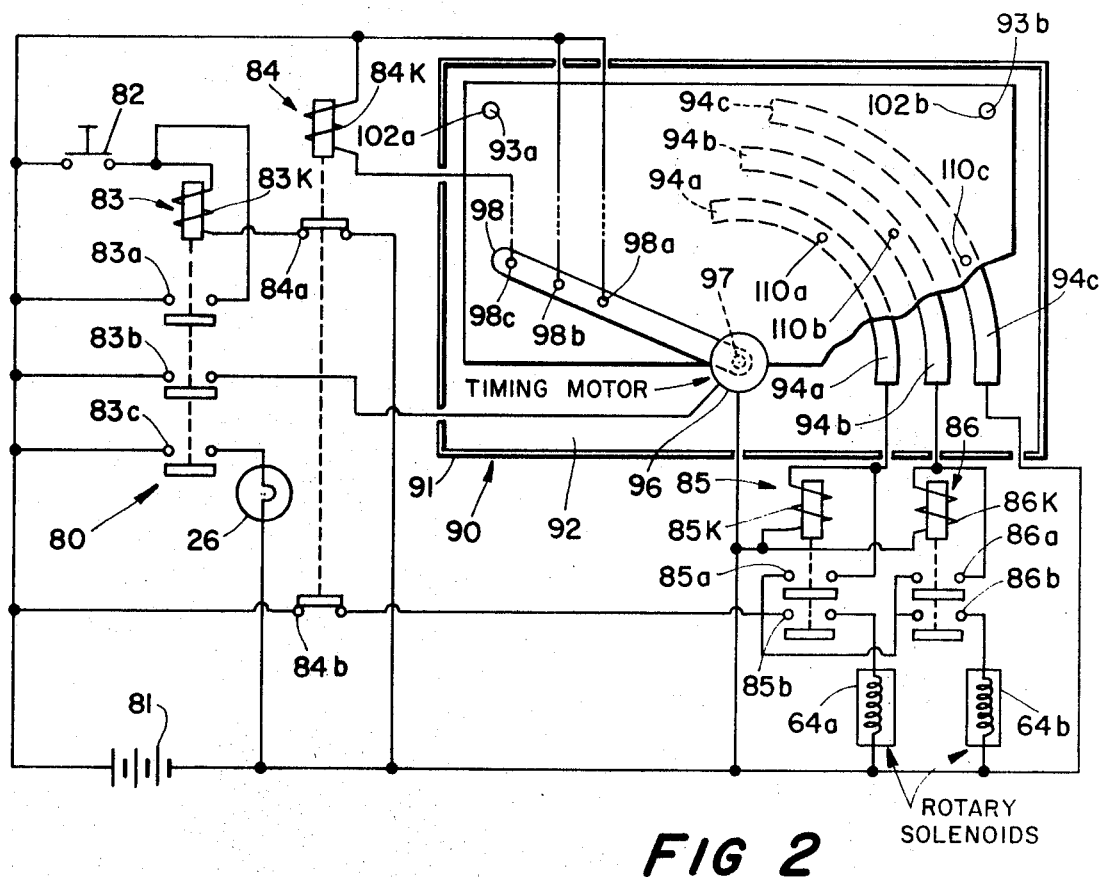
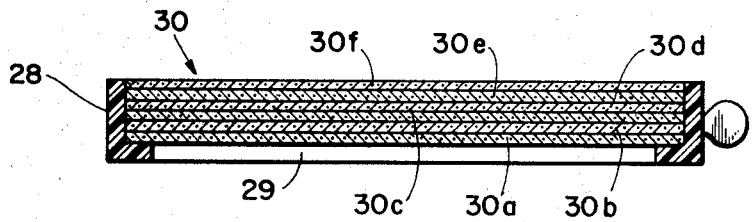
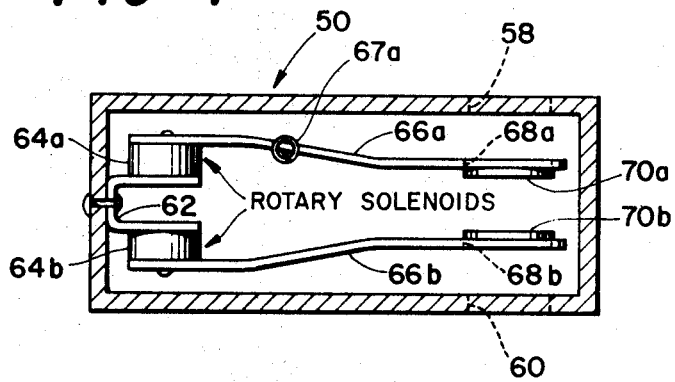
INVENTOR.
ROY A. CLAPP
BY
Dugger, Peterson, Johnson & Westman
Attorneys

United States Patent Office 3,516,740
Patented June 23, 1970

3,516,740
ILLUMINATION CONTROL DURING COLOR PRINTING
Roy A. Clapp, 10522 Foley Blvd.,
Coon Rapids, Minn. 55433
Filed Feb. 20, 1968, Ser. No. 706,849
Int. Cl. G03b 27/76
U.S. Cl. 355—36                                    14 Claims

ABSTRACT OF THE DISCLOSURE

A basic filter pack or unit is provided which will compensate for the individual emulsion batch number, the particular equipment and other fixed or semi-fixed conditions. The basic filter pack will be used for a relatively large number of production negatives. The filter pack, however, is deliberately left undercorrected so that the desired correction, in order to obtain an adjusted color balance, may be made with an attachment comprised of individual filters for the particular negative which individual filters are controlled by recorded information signals so that they are introduced into the printing beam at the proper moment and retained in said beam for a requisite amount of additional exposure time after a predetermined amount of exposure time has taken place with only the basic filter pack in the light beam. The final state of filtration is provided by the recorded information.

BACKGROUND OF THE INVENTION

Field of the invention

This invention relates generally to the photographic printing of color pictures, and pertains more particularly to a method and apparatus, as well as a card, with recorded information thereon for controlling the illumination during color printing in order to realize the desired color balance.

Description of the prior art

Two methods or procedures are presently in common use:

(1) The first prior art method can be employed with any photographic enlarger which has a source of white light (usually a tungsten lamp). By providing color correcting (CC) or color printing (CP) filters, certain frequency or wavelength bands of light energy may be selectively attenuated to control and derive what is known as "color balance." This color balance must be adjusted to the printing requirements of each negative to be printed. The adjustment is effected by trial and error in making test prints, or preferably by prereading the negative with a color densitometer for the purpose of determining the different filters which are required and which are collectively known as a "filter pack." The optical density of the filters constituting the filter pack are so chosen that two of the three primary color energy bands are attenuated so that all three emulsion layers are properly exposed when the illumination is allowed to act for a common exposure time. Usually, this time is controlled by opening or closing the lens diaphragm so that all of the printing is done at a fixed time interval, the purpose of this being to avoid the problems introduced by reciprocity failure. Although there is an approximate reciprocal relationship between the duration of exposure and intensity of illumination, this relationship is not exact; this phenomenon is known as "reciprocity failure."

(2) The second method of printing is to start the exposures simultaneously with the illumination which is not specifically color balanced for the particular negative being printed, then to measure the quanta of primary colors, that is the quanta of red, green and blue light, after the light has been transmitted through the negative and to thereafter determine when the quanta is correct for the required amount of exposure. The amount of red, green and blue light is measured by photoelectric means associated with an electromechanical system which system introduces a color filter under the sensing control of the photoelectric means. The filter that is introduced is selected so as to cut off all, or substantially all, of the corresponding spectral band of light, while at the same time permitting the light energy corresponding to the two remaining colors to continue during the rest of the exposure period. The particular filter that is in effect selected by the photoelectric means is either yellow, magenta or cyan, there being one such filter introduced at one time and then followed by a second filter from this grouping. In a given situation, it can be supposed that the blue exposure has provided a sufficient quanta of light energy to correctly expose the blue sensitive emulsion layer and as soon as the photocell that senses the blue light determines that this satisfaction has been realized, it causes a control signal to be produced that results in the yellow filter being moved into the light beam (usually quite close to the objective lens). The yellow filter therefore cuts off all of the blue light energy, thereby preventing any further exposure of the blue sensitive emulsion layer while at the same time allowing the red and green light to be transmitted so that it impinges upon the emulsion surface to provide a continued exposure of the two remaining layers of the emulsion surface. Assuming next that the green sensitive emulsion layer is satisfied, the green reading photocell circuit functions in the same way to introduce a magenta filter which by itself can transmit both red and blue light. However, since the yellow filter is in the light beam, any blue light transmitted by the magenta filter is absorbed by the yellow filter. Hence, only red light can continue so as to impinge upon the emulsion surface. When the third emulsion layer is satisfied as to the red light, this being by reason of the red photocell circuit determining this, a cyan filter is introduced into the light path which removes the last remaining band of light energy, thus terminating the exposure; or more commonly, a shutter is inserted which serves this same purpose.

From the above explanation given with respect to the two systems in current use, it will be seen that in connection with the first described method the time of exposure can be fixed; in the second described method, the time for each of the three primary color layers will differ. The term "reciprocity failure" has hereinbefore been defined. Thus, since there is only an approximate reciprocal relation between the exposure period and the illumination intensity, this type of failure can become quite important. Since ordinary photocell circuits cannot distinguish between light intensity and duration except in a reciprocal fashion, it has been necessary to provide special compensating circuits sometimes referred to as "slope control" circuits to compensate for reciprocity failure. Such circuits are quite complicated and require expert adjustment and maintenance.

SUMMARY OF THE INVENTION

The first prior art method mentioned above necessitates a constant manual changing of individual filter elements in order to have the right makeup of filters in the so-called filter pack. An object of the present invention is to avoid the need for manually changing filters each time that a different negative is used.

Another object of the invention is to provide an illumination system for color printing which eliminates reciprocity failure and the need for slope control circuitry.

A further object of the present invention is to provide a simple and convenient method of adjusting the color balance of printing illumination and to eliminate the time consumed by the manual insertion of different filters to make up different filter packs. Instead, the illumination is controlled so that color balance is realized by infinite steps in a manner so that the attenuation is continuously variable.

Yet another object of the invention is to eliminate the time lag heretofore experienced when a photocell circuit determines the instant that the exposure period should be terminated for a given color satisfaction. The electromechanical means for introducing the filter is also obviated and a simplified system is made available.

Still another object of the invention is to minimize the light loss inherent in the requirement for a substantial number of individual filters, each of which reduces the useful illumination by about 10% due to the surface reflection of the filters.

Briefly, the instant invention allows for signaling when the introduction of a filter should be made, doing so ahead of the moment that it is actually required, and in this way the insertion of the proper filter at the correct theoretical instant is made possible with the consequence that much shorter exposure times for making prints are realized in a practical fashion. A permanent record of the color balancing is provided in the form of a punched card and this card can be readily filed with the negative for which it is prepared so that any future reprint orders can be made without the need for reanalyzing the negative or maintaining any other record keeping systems. Still further, since there has in the past been a time lag as far as inserting sharp cut-off filters, thus introducing a fixed time constant that is added to the theoretical exposure period, it is necessary to have an exposure time for all three emulsion layers that is long enough so that the error does not become too objectionable, the fixed time not being susceptible to a reduction beyond a practical mechanical limitation.

BRIEF DESCRIPTION OF THE DRAWINGS

FIG. 1 is a side elevational view illustrating a conventional enlarger with an attachment added thereto in accordance with the teachings of the present invention;

FIG. 2 is a sectional view taken generally in the direction of line 2—2 of FIG. 1 for the purpose of depicting on a relatively large scale the drawer that contains the basic filter pack;

FIG. 3 is a view taken in the direction of line 3—3 of FIG. 1 on a larger scale for the purpose of illustrating the attachment that has been added to the conventional enlarger, a portion of the top of the attachment being removed so as to expose to view one of the auxiliary filters;

FIG. 4 is a view taken in the direction of line 4—4 of FIG. 3, this particular view allowing both auxiliary filters to be seen;

FIG. 5 is a top plan view of a card that contains signal information for controlling the insertion of the auxiliary filters visible in FIG. 4, and FIG. 6 is a top plan view of the card depicted in FIG. 5, the card being shown in association with the circuitry for controlling the insertion of the auxiliary filters of FIG. 4.

DESCRIPTION OF THE PREFERRED EMBODIMENT

Referring first to FIG. 1, a conventional enlarger has been denoted generally by the reference numeral 10. Although the enlarger 10 is of conventional construction, it will be of assistance in appreciating the benefits to be derived from the present invention to refer to certain parts thereof. Accordingly, the enlarger 10 comprises a base 12 having an upstanding column 14. The column 14 supports a lamp house platform 16 having an integral tubular sleeve bearing 18 which circles the column 14, a set screw 20 being employed for holding the platform 16 at any preferred elevation. Supported on the platform 16 is a reflector 22, a portion of which has been broken away so as to show the presence of a socket 24 into which a lamp 26 has been inserted. The lamp 26 also appears in the schematic diagram set forth in FIG. 6.

Continuing with the description of the enlarger 10, the enlarger further includes a filter drawer 28 having an opening 29 (FIG. 2) in the bottom thereof. The purpose of the drawer 28 is to hold the basic filter pack that will be described with greater particularity hereinafter. At the moment, though, it will suffice to state that the basic filter pack is denoted generally by the reference numeral 30 and is composed of individual filter elements 30a, 30b, 30c, 30d, 30e and 30f.

The lamp house platform 16 is formed with a slot 32 into which a production negative 34 is inserted when making a print. It will be appreciated that the basic filter pack 30 and the production negative 34 are in the light path provided by the lamp 26.

Depending from the lamp house platform 16 is a gear rack 36. Still further, a bellows 38 is attached at its upper end to the platform 16. At the lower end of the bellows 38 is a lens platform 40 having a lens unit 42 directly therebeneath. Integral with the lens platform 40 is a sleeve bearing 44 having a focusing knob 46 associated therewith so that the sleeve bearing 44 can be raised and lowered with respect to the depending rack 36.

The constructional details given above completes the description of the enlarger 10. However, a sheet of color-sensitive paper 48 has been shown in FIG. 1, the paper 48 resting upon the base 12. It will be appreciated that the paper 48 provides a color-sensitive emulsion surface composed of three individual layers which are sensitive to the three primary color bands, red, blue and green. While the printing in the depicted instance will be from the negative 34 to the paper 48 which is thus from negative to positive, the invention, as will later be appreciated, can be from negative to negative or from positive to positive.

Passing now to a description of an attachment that is utilized when practicing the invention, it will be pointed out that this attachment has been generally indicated by the reference numeral 50. The attachment includes a housing 52 that is generally enclosed on all six sides. While it is possible to support the attachment 50 from the lens unit 42 or directly from the lens platform, for the sake of discussion the housing 52 has been pictured with a laterally extending clip or clamp 54, screws 55 securing the clamp to one side of the housing 52. An additional screw 56 when tightened causes the clamp 54 to grip the sleeve bearing 44. In this way, the attachment 50, as its name implies, can be added to virtually any conventional enlarger 10. The housing 52 has upper and lower aligned openings 58 and 60, respectively (FIG. 4), these openings 58, 60 being on a common vertical axis so that the light provided by the lamp 26 can pass through the housing 52 via these openings.

Within the housing 52 is a bracket 62 on which are mounted a pair of rotary solenoids 64a and 64b. As can be discerned from FIGS. 3 and 4, the rotary solenoid 64a actuates a pivotal arm 66a by overcoming the bias of a return spring 67a, the arm 66a having an opening 68a near its free end. A suitable color filter 70a (identified more specifically hereinafter) is cemented to the arm 66a, covering the opening 68a. Similarly, as can be understood from FIG. 4, the rotary solenoid 64b controls an arm 66b (overcoming the action of a spring corresponding to spring 67a) which arm has an opening 68b near its free end, a filter 70b being cemented over the opening 68b in a manner corresponding to the way the filter 70a is mounted with respect to the opening 68a in the arm 66a. Although both springs have not been illustrated, it will be appreciated that both pivotal arms 66b, as well as arm 66a, are biased in an angular direction so that the filters 70a and 70b are normally out of registry with the aligned openings 58 and 60 provided in the housing 52.

It will be recognized that when either of the solenoids 64a or 64b is energized that its particular filter 70a or 70b, as the case may be, is swung into alignment with the openings 58 and 60, thereby positioning or inserting the particular filter into the light path. The selection of the particular filters 70a and 70b will be dealt with presently.

At this time, the manner in which the solenoids 64a and 64b are energized will be described. It will be helpful to refer to FIG. 6 in which a solenoid control circuit labeled 80 has been presented. This circuitry 80 includes a source of power in the form of a battery 81. Through the agency of a pushbutton switch 82 an electrical path is established through the coil 83K of a relay 83, the relay having normally open contacts 83a, 83b and 83c. The contacts 83a, as is apparent from a study of FIG. 6, are in parallel with the coil 83K and the pushbutton switch 82, thereby functioning as sealing contacts so that the relay 83 will remain energized or picked up after the pushbutton switch 82 has been released. The coil 83K of the relay 83, in addition to being in series with the switch 82, is in series with normally closed contacts 84a of a termination 84 having an operating coil 84K; the relay 84 has a second set of normally closed contacts 84b. The contacts 84c are in circuit with the earlier mentioned lamp 26. Consequently, whenever the relay 83 is picked up, the contacts 83c are closed and electric power is fed to the lamp 26. For the sake of completion, relays 85 and 86 may be deemed to be included in the circuit 80. The relay 85 has an operating coil 85K and normally open contacts 85a and 85b, these contacts being connected to the battery 81 through the contacts 84b of the termination relay 84; the contacts 85a function as sealing contacts and the contacts 85b as contacts for energizing the rotary solenoid 64a. Similarly, the relay 86 has an operating coil 86K and normally open contacts 86a and 86b corresponding in function to the contacts 85a and 85b, respectively, the contacts 86b serving as the means by way of which the rotary solenoid 64b is energized when the relay 86 is picked up.

Also depicted in FIG. 6 is a timing control device 90 which includes a box 91 having a bottom panel 92. Extending upwardly from the bottom panel 92 are pins 93a and 93b. On the upper face of the bottom panel 92 are arcuate metal strips or contacts 94a, 94b and 94c. Also contained in the box 91, being supported on the bottom panel 92, is a timing motor 96 similar to the synchronous type of motor employed in electric clocks. In this regard, it will be noted that the electric power source 81 for the control circuit 80 has been illustrated as a battery. Strictly speaking, the battery would be an alternating current source and this same source can be used for supplying electric power to the timing motor 96. The motor 96 has a shaft 97 to which is affixed an arm 98 with contacts 98a, 98b and 98c carried thereon. These contacts 98a, 98b and 98c, as is evident from FIG. 6, are at different radial locations on the arm 98 and coact with the arcuate strips or contacts 94a, 94b and 94c in a manner described immediately below.

Having mentioned the control circuit 80 and the timing control device 90, it will now be explained that a media element in the form of a card 100 of dielectric material is utilized. This card 100 appears in both FIGS. 5 and 6. It will be observed that a pair of alignment holes 102a and 102b are provided in two of the corners of the card, these holes allowing the previously mentioned upright pins 93a and 93b to project therethrough. A semicircular notch 104 provides needed clearance with the motor shaft 97. Hence, when the card is placed in the box 91, it will have a specific orientation with respect to the timing motor 96, more specifically the contact arm 98 rotatable thereby. As shown in FIG. 5, the card 100 has several curved lines 106a, 106b and 106c printed thereon, these lines indicating the arcuate paths traversed by the contacts 98a, 98b and 98c. A series of radial lines indicated generally by the reference numeral 108 serve as aids in the forming of holes 110a, 110b and 110c. These holes 110a, 110b and 110c represent recorded signal information that serve to control the energization of the rotary solenoids 64a and 64b as well as the extinguishment of the lamp 26. More specifically, it will be recognized that when the contact 98a reaches the hole 110a there is an energization of the relay 85 and an electrical path provided through the contacts 85b to the rotary solenoid 64a which causes the filter element 70a to be swung into juxtaposition with the vertically aligned openings 58 and 60 in the housing 52 of the attachment 50. Similarly, when the contact 98b reaches the hole 110b, the solenoid 64b is energized via the contacts 86b of the relay 86 to move the filter element 70b into alignment with the openings 58, 60. Although in actual practice the engagement of the contact 98c with the arcuate strip or contact 94c via the hole 110c would result in the energization of a solenoid that would move a shutter into the beam of light provided by the lamp 26, for the sake of simplicity the completion of the circuit through the contacts 98c and 94c will result in an energization of the termination relay 84. The termination relay 84, when energized, opens its contacts 84a so that the relay 83 becomes de-energized and its contacts 83c opened so as to break the circuit to the lamp 26. Concomitantly, the contacts 84b of the relay 84 are opened to de-energize the relays 85, 86 and the solenoids 64a, 64b controlled thereby. At this stage of the description, it should be plain that the location of the several holes 110a, 110b and 110c represent information that can be utilized in the control of the rotary solenoids 64a and 64b, as well as the termination of the complete exposure when the lamp 26 is extinguished. It should also be apparent that various cards 100 can be prepared and the information recorded simply by punching the holes 110a, 110b and 110c at the proper locations.

Before presenting a typical operational sequence, it is believed that sufficient information has been given so that the procedures that are initially to be followed can be understood. The starting point when utilizing the apparatus and method of the instant invention is the same as with any other printing system in that a reference negative is selected and the proper printing conditions for the reference negative established. For example, using the standard white light printing procedure, the composition of a reference filter pack that is satisfactory as to the time of exposure and the f/stop of the enlarger lens unit 42 of the enlarger 10 must be determined. Trial and error techniques can be resorted to in connection with this preliminary or initial choice. It can be logically assumed that the reference negative will be selected so as to be typical of the mid-range covered by the production negatives, one such production negative 34 appearing in FIG. 1. A group of production negatives will vary with respect to each other as to the amount of required filtration so that the extreme cases will require about an equal but opposite amount of filtration. In the present example, it has been assumed that the full range of the production negatives can be covered by color correcting (CC) filters having a density of 0.40 and that the reference negative is exactly halfway along this range. In fact, this range is normally adequate but a greater or lesser range can be covered by altering the filter density within the enlarged attachment 50.

After a correct reference filter pack is determined for a particular negative or group of negatives, the correct basic filter pack 30 for use with the attachment 50 can be selected, this being done in the present instant by subtracting 0.20 magenta and 0.20 yellow from the reference pack which is known to produce a generally satisfactory print from the reference negative. Using the basic filter pack, the required range for the production negatives can be produced by the combination of the basic filter pack and the attachment.

Quite obviously, if the reference negative is not typical of the mid-point in the range of production negatives, this fact must be taken into account in determining the amount of density to be subtracted for the magenta and yellow in the forming of the basic filter pack that is resorted to during the production run. As long as the equipment and emulsion batch remains constant, the combination of filtration produced by the basic filter pack 30 and the enlarger attachment 50 will produce accurate results. However, when the emulsion batches change or any other of the basic conditions change, such as the exposure time, it will be necessary to again make a series of test prints from the reference negative and to establish a new filter requirement for a reference pack that will be satisfactory, a new basic filter pack 30 then being made up for the changed conditions. At this stage, it should be recognized that any change in conditions is reflected by a change in the basic filter pack in combination with the final stage of filtration provided by my enlarger attachment 50 to always produce the correct printing conditions. With this in mind, the particular punched card 100 can be filed with the particular production negative 34 so that the negative 34 can be reprinted at any time even though conditions other than the negative have changed.

Perhaps the advantages of my system can be best understood by comparing my system with the two methods hereinbefore mentioned. In laboratories that print by the standard white light method, a negative is analyzed by a color densitometer or a color negative analyzer (somewhat similar to a closed circuit color television channel), either the densitometer or analyzer being used to compare the particular production negative with a reference negative for which all of the conditions for obtaining a good print are known and recorded. On this basis, the required filter values are determined. For instance, supposing that the analysis indicates that a given negative requires 0.475 yellow and 0.275 magenta, the basic filter pack 30 can then be built up by using 0.20 magenta plus 0.05 magenta plus 0.025 magenta, together with 0.4 yellow plus 0.05 yellow plus 0.025 yellow. This results in the absolute minimum number of filter elements 30a–30f that will achieve these particular optical densities. Accordingly, the six individual filter elements constitute the basic filter pack 30 and this filter pack 30 is placed in the drawer 28 of the enlarger 10. It will be understood that the six filters 30a–30f, each transmitting 90% useful light, combine to transmit 0.96 useful illumination. Consequently, only 53% of the total incident illumination from the lamp 26 is available for use after passing through the basic filter pack 30. This is for the ideal condition with new filters which have not been scratched or soiled and also upon the assumption that the exact values are available. In many cases a density of 0.40 may have to be made up by combining several filters, such as 0.20 plus two filters having a density of 0.10 and this, quite obviously, introduces a further loss as far as the effective illumination reaching the color sensitive paper 48.

Since it is important to have a standard exposure time, and this time is limited in choice by providing enough exposure for printing the densest negatives that are to be handled, there is a distinct gain in productivity in keeping the number of filters to a minimum. Accordingly, the principal aim of the present invention is to provide the basic filter pack 30 that is used in the filter drawer 28 and which is selected to compensate for the individual emulsion batch number, the particular equipment and other fixed or semi-fixed conditions. It is to be distinctly understood, though, that the basic filter pack 30 is left deliberately under-corrected so that the desired correction can be made by my attachment 50 which serves as a fine or narrow adjustment. For example, in the situation described above, if the filter pack 30 is composed so as to have 0.30 yellow and 0.10 magenta, then it would be necessary to add 0.175 magenta correction through the agency of the attachment 50. An optical density of 0.175 is equivalent to reducing the transmission by approximately 67.5% for the corresponding portion of the spectrum.

Assuming that in the attachment 50 there are yellow and magenta filters having an optical density of 0.40 which has the result of reducing the light transmission of blue and green to about 40%, it will be appreciated that if these filters are inserted at the beginning of the exposure interval and are allowed to remain throughout the entire exposure period too much green and too much blue light would be absorbed. On the other hand, if the filters are not introduced at all, the amount of green and blue light will be excessive. If at the appropriate instant of time these filters are inserted they will absorb the correct amount of light so as to provide the exact photon quanta so that the desired color balance will be provided as far as the printing of the paper 48 is concerned. A simple formula allows the determination of the time that these filters should be in the light beam in order to achieve the light quanta that will be transmitted onto the paper 48 as though a filter pack having the 67.5% transmission characteristic is employed.

Expressed as a percentage of the total time of exposure, the above-alluded to formula would be $$1-X+0.4X=0.675$$

where X is the time that the filters should remain in place to provide the desired end result. X is, therefore, approximately 0.54 or 54% of the exposure time. In other words, during the 46% of the exposure time at full light intensity, 46% of the light quanta reaches the paper 48. Consequently, for the remaining 54% of the exposure period, light quanta is transmitted at about 40% of full intensity so that roughly 21.5% of the light quanta is transmitted during this particular interval. The sum of the two quantities equal 67.5%, this being the desired figure in the present instant. Thus, by resorting to a precalculation of the foregoing type, the equivalent attenuation for any percentage of time that the filters are to be in the light path can be found and these time percentages can be marked on the card 100 so that the holes 110a, 110b and also the hole 100c can be punched at the proper locations. Any time lag behind a theoretical figure that is calculated can be allowed for by placing the holes 110a and 110b in advance of their calculated position by a fixed time increment, more specifically, a fixed angular distance on the card 100. In other words, so the arm 98 will sweep an arc somewhat less than the calculated angular distance. Such an allowance or compensation is impossible where electrical circuits are employed utilizing photoelectrical means during the actual exposure because by the time the actual exposure period has been measured by the photoelectrical means it is already too late. While it is possible to make an allowance on a percentage basis as far as the timing is concerned with a photocell circuit arrangement, this percentage is not a percentage of the time but a constant so that compensation can be introduced only by way of exceedingly elaborate and complicated circuitry. The present invention is extremely direct. The punched card 100 always gives a permanent record free of any error since the holes which record the information also serve to control the factors. Also, the record is of practical value for reprinting even though conditions may change in the processing and also as far as subsequent emulsion batches are concerned. Such a situation prevails because the use of the basic filter pack 30 allows for corrections to be made for different emulsion batches and/or equipment changes. Hence, the attachment 50 functions merely to introduce those changes that are peculiar to the particular production negative, such as the negative 34.

Having presented the foregoing description, it is thought that the manner in which my apparatus operates should be understood. However, since the inventon also relates to the method and also the particular media element finding antecedent basis in the card 100, a brief operational sequence will enable those familiar with this type of art to appreciate better the benefits to be obtained from a practicing of the invention. Accordingly, assuming that the basic filter pack 30 has been properly selected for the group of production negatives that are to be handled, the particular filter elements 70a and 70b will be selected so as to provide the final amount of attenuation after the basic filter pack 30 has been in the light beam for a predetermined length of time.

All that the operator need do after inserting the production negative 34 into the slot 32, this being done with the drawer 28 in place, is to close the pushbutton switch 82. Such action results in the energization of the relay 83. Not only does the relay hold itself in or picked up by virtue of the closing of its contacts 83a but the closing of the contacts 83b cause the timing motor 96 to start running. At the same time, the contacts 83c close to supply power to the lamp 26.

During the time that the contact arm 98 is rotating from the position in which it appears in FIG. 6 to a position overlying the hole 110a the basic filter pack 30 will provide the only attenuation. It has previously been mentioned that the basic filter pack affords only an undercorrection as far as the attenuation is concerned.

Assuming that the filter element 70a is a yellow filter, when the arm 98 moves so that the contact 98a is in registry with the hole 110a in the card, the dielectric characteristic of the card preventing contact until this moment, there is then an electrical path completed through the rotary solenoid 64a so that the pivotal arm 66a is then swung so that the filter element 70a is moved into the light beam, the spring 67a yielding sufficiently to allow this to happen. The insertion of the yellow filter element 70a attenuates the light energy having a wavelength or frequency in the blue range and therefore the blue light energy contained in the light from the lamp 26 is prevented from reaching the paper 48, although the light falling within the frequency or wavelength bands corresponding to red and green light will continue and thus the exposure of the remaining two layers of emulsion on the paper 48 will receive this light. In other words, the basic filter pack 30 provides substantial satisfaction as far as the blue sensitive emulsion layer of the paper 48 is concerned, doing so during the initial period that the contact arm 98 is moving. It is when the arm 98 has moved sufficiently so as to cause the contact 98a to engage the contact 94a through the hole 110a that the solenoid 64a becomes energized. The particular location of the hole 110a on the card 100 influences the initial exposure period. The solenoid 64a remains energized even after the contact 98a has passed beyond the hole 110a.

When the arm 98 moves so that the contact 98b is in alignment with the hole 110b, then the remaining solenoid 64b becomes energized with the consquence that the filter element 70b is inserted into the light beam. Assuming that this takes place after the light in the green frequency band is satsified and that the filter element 70b is a magenta filter, both red and blue light is passed by the filter 70b. However, since the yellow filter element 70a is still in place, any blue light transmitted by the magenta filter element 70b is removed by the yellow filter element 70a so that the three energy bands in the illumination can continue to transmit light only in the red wavelength band. When the third layer of emulsion contained on the paper 48 is satisfied by the red light that it receives, a cyan filter (not shown) can be inserted. More commonly, the engagement of the contact 98c with the contact 94c through the hole 110c will cause a solenoid to be energized that will insert a shutter in the light path to provide the same results. Inasmuch as it simplifies the circuitry somewhat, the result is that the lamp 26 is extinguished by reason of the termination relay 84 becoming energized and thus de-energizing the relay 83 and opening the contacts 83c which are in circuit with the lamp 26.

In closing, it will be appreciated that the device 90, together with the particular card 100, serves as a storage means containing recorded signal information in the form of the holes 110a, 110b and 110c which determine the period that the auxiliary filter elements 70a and 70b are to remain in the light beam, this being by virtue of the moment at which each is inserted. The circuit 80, together with the solenoids 64a and 64b, constitutes a means responsive to the signal information so that the exposure is continued on an attenuated basis that is more pronounced for the requisite amount of time to thereby provide a desired degree of color balance in the print being made from the color sensitive paper 48. Once again, it shoud be made clear that the holes 110a, 110b and 110c can be properly located for a particular production negative 34. When another production negative 34 is substituted for the one actually appearing in FIG. 1, then a second card corresponding to the card 100 will be substituted in the device 90 and a different timing result will ensue for that particular card. Each production negative in accordance with the teachings of the present invention will have a card 100 made therefor with the holes 110a, 110b and 110c in each instance located so as to provide the requisite amount of light attenuation which is desirable in the achievement of the requisite color balance for the particular negative 34 that the card 100 is intended to be used in conjunction with.

I claim:

1. Apparatus for controlling the illumination during color printing comprising means for directing a beam of white light through a basic filter means and a given color negative onto a color-sensitive emulsion surface to produce a color print, said basic filter means compensating for the specific batch number of said emulsion surface, means for inserting into said light beam an auxiliary filter means at a time when said emulsion surface remains undercorrected for light energy in at least one frequency band, storage means containing recorded signal information pertaining to the period that said auxiliary filter means should remain in said light beam to produce a satisfied condition for said given negative of said undercorrected frequency band as provided by said basic filter means, and means responsive to the signal information contained in said storage means for continuing the exposure to light containing said one frequency band for a period needed to achieve substantial satisfaction to light in said one frequency band for said negative, whereby a desired degree of color balance is imparted to said print for said negative.

2. Apparatus in accordance with claim 1 in which said storage means contains signal information pertaining to the time at which said auxiliary filter means should be introduced and said responsive means controls the time at which said auxiliary filter means is inserted into said light beam.

3. Apparatus in accordance with claim 2 in which said storage means contains recorded signal information that terminates the exposure to light passing through said auxiliary filter means and said responsive means terminates the overall exposure period after said substantial satisfaction has been realized.

4. Apparatus in accordance with claim 3 in which said signal information is recorded on a removable media element so that it may be replaced with a second media element when a second negative is being used, said second media element having information recorded thereon pertaining to said second negative.

5. Apparatus in accordance with claim 4 in which said media elements comprise cards of dielectric material, each card having spaced holes therein located so as to provide the information pertaining to its particular negative.

6. Apparatus in accordance with claim 5 in which said storage means includes a timer motor, a contact arm rotated by said motor, said arm having a first electrical contact thereon for completing an electrical circuit when it encounters one of said holes to cause said responsive means to effect actuation of said inserting means and having a second electrical contact thereon for completing an electrical circuit when it encounters a second of said holes to terminate the overall exposure period.

7. Apparatus in accordance with claim 6 in which said auxiliary filter means includes first and second filters, each being capable of passing light in a different needed frequency band, said inserting means including a first solenoid for inserting said first filter and a second solenoid for inserting said second filter, said first electrical contact completing an electrical circuit through said first solenoid when said one hole is encountered to insert said first filter into said light beam, said cards each having an additional hole intermediate the first-mentioned holes, and said arm having a third contact for completing an electrical circuit through said second solenoid when said third contact encounters the additional hole for the particular card being used.

8. Apparatus for controlling the illumination during color printing comprising means for directing a beam of white light through a color negative onto a color-sensitive surface to be printed, means for attenuating certain frequencies in said white light in accordance with the emulsion characteristics of said surface to provide a basic adjustment of the color balance of light striking said surface, means for inserting auxiliary attenuating means into said light beam that will attenuate light energy for which correction has been made by said first-mentioned attentuating means and which will pass light having a frequency band not corrected for by said first-mentioned attenutating means in accordance with the light transmission characteristics of said negative, and record means for actuating said inserting means to introduce said auxiliary means after said surface has been exposed to light for a predetermined time through said first-mentioned attenuating means.

9. A method for controlling the illumination during color printing comprising the steps of recording information pertaining to the exposure period and wavelength of light needed for a particular color negative in order to provide a desired color balance of a color-sensitive emulsion surface after exposure of said surface through a basic filter unit having frequency attenuating characteristics related to the batch number of said emulsion surface, passing light through said basic filter unit for a period of time in accordance with said recorded information and thereafter continuing the exposure through an auxiliary filter also in accordance with said recorded information so as to complete the exposure of said emulsion surface and thereby derive the desired degree of color balance.

10. A media element for use in color printing comprising a card containing stored signal information thereon pertaining to a particular color negative for use with a basic filter pack providing compensation for a given emulsion batch number, the stored signal information controlling the percentage of total exposure time of light striking a color-sensitive surface when making a print from said negative in order to adjust the color balance of the print, said signal information relating to a frequency band not completely corrected for by the basic filter pack.

11. A media element in accordance with claim 10 in which said card has at least one hole having a location representative of the stored signal information.

12. A media element in accordance with claim 11 in which said card has a plurality of additional holes for orienting said card in a specific relation during use.

13. A media element in accordance with claim 12 in which said card is of dielectric material so that said additional holes orient said card in a specific relation in order that at least one hole is encountered by a movable electric contact after said contact has traveled a predetermined distance over said card.

14. A method for controlling the illumination during color printing comprising the steps of preparing a basic filter pack providing compensation for a particular emulsion batch number and which when used with any one of a group of negatives will provide at least one frequency band that remains undercorrected as far as a color-sensitive emulsion surface having said particular emulsion batch number when said surface is exposed to printing light passing through said basic filter pack for a predetermined period of time, passing printing light through said basic filter pack and one of said negatives for said predetermined period of time, then inserting a filter in said printing light which transmits light in said undercorrected frequency band, and continuing the exposure for an additional period of time through said basic filter pack, said inserted filter and said negative for an additional period of time sufficient to achieve substantial satisfaction of said surface to light in said undercorrected frequency band.

References Cited

UNITED STATES PATENTS 2,990,762   7/1961   Baumbach et al. ____ 355—111

FOREIGN PATENTS 1,050,182   2/1959   Germany.

NORTON ANSHER, Primary Examiner

R. A. WINTERCORN, Assistant Examiner

U.S. Cl. X.R.

355—101, 111; 352—92; 95—4.5